UNITED STATES PATENT OFFICE.

JOSEPH WILKINS, OF BALTIMORE, MARYLAND.

IMPROVEMENT IN PROCESSES FOR SEPARATING WOOL FROM MIXED FABRICS.

Specification forming part of Letters Patent No. 177,606, dated May 16, 1876; application filed April 17, 1876.

*To all whom it may concern:*

Be it known that I, JOSEPH WILKINS, of Baltimore city, State of Maryland, have invented a new and Improved Process of Separating Wool from its Admixture with Cotton Fiber; and I do hereby declare that the following is a full, clear, and exact description of the same.

My invention relates to an improved process for separating wool fiber from its admixture with cotton, for the purpose of utilizing the wool mixed with cotton in old rags. This has been done heretofore by nitric, sulphuric, or hydrochloric acids, which, while they attack and destroy the cotton fiber, have but comparatively little effect upon the wool. But while these acids do not dissolve the wool, the effect is more or less deleterious, in that it makes the wool harsher, and of weaker fiber.

My invention consists in the use of chromic acid, or any of its compounds, from which it may be liberated by the action of the other acids, which chromic acid, by reason of its affinity for the albumen of the wool, prevents the injurious action of the more active acids, and while permitting the elimination of the cotton by the well-known action of the acids, prevents the bad effects of the same upon the wool.

In carrying out my invention I mix in a boiler with thirty or more gallons of water, sulphuric acid until the hydrometer of acid (Baumé's scale, temperature 62° Fahrenheit) shows from 8° to 12°, according to the quality of the rags. I then add bichromate of potash until the same hydrometer shows an additional one-half of 1°. After the above mixture has been made to boil by the application of heat, I immerse the rags therein and allow them to remain in the boiling-mixture from five to ten minutes, according to the quality of the rags. I then remove and rinse them in water, when the cotton will separate and leave the wool uninjured, which can be then dried, picked, and carded, and as a merchantable article is ready to be worked over again in all woolen or mixed fabrics.

Hydrochloric or nitric acid can be used in the place of sulphuric; but the chlorine of the hydrochloric acid enters into injurious chemical combination with the wool, and the nitric acid is more expensive. All of these acids have more or less effect on the wool while they are decomposing the cotton; but by the addition of chromic acid this action is neutralized. This is the case by reason of the fact that wool is rich in albumen while the cotton is not, and chromic acid has a stronger affinity for albumen than any other known substance, and by reason of such affinity it prevents the injurious action of the other acids.

Bichromate of potash is here used simply as a vehicle of chromic acid, or a means for producing the same. A portion of the sulphuric acid unites with the potash, forming sulphate of potash, while the chromic acid is set free.

I do not confine myself to the use of bichromate of potash, however, as pure chromic acid or other salt of chromium may be used. In practicing my invention I do not confine myself to the particular means of applying and using the chromic acid, but I may first immerse the rags in a solution of bichromate of potash, or other salt of chromic acid, of a density of about one-half of 1°, (Baumé's scale for acid,) and afterward subject the rags to the action of the acid.

Wool reclaimed by my process has nearly the same integrity, pliancy, and softness of fiber that characterizes new wool, and can be utilized for any of the purposes for which the latter is employed.

Having thus described my invention, what I claim as new is—

The herein-described process of separating wool from its admixture with cotton fiber, by subjecting the rags or mixed fiber to the action of sulphuric, nitric, or hydrochloric acids in the presence of chromic acid or a salt of chromium, substantially as and for the purpose described.

The above specification of my invention signed by me this 13th day of April, 1876.

JOS. WILKINS.

Witnesses:
 CHAS. A. PETTIT,
 SOLON C. KEMON.